United States Patent [19]

Garvey

[11] 4,049,083
[45] Sept. 20, 1977

[54] ELECTRICALLY POWERED HAND TRUCK WITH STACKER ATTACHMENT

[75] Inventor: Eugene N. Garvey, Appleton, Wis.

[73] Assignee: Woodward Mfg. & Sales Co., Inc., Appleton, Wis.

[21] Appl. No.: 744,425

[22] Filed: Nov. 23, 1976

[51] Int. Cl.$^2$ .............................................. B66B 9/20
[52] U.S. Cl. .................................. 187/9 R; 187/10; 214/620
[58] Field of Search ...................... 214/370, 372, 620; 280/5.3, 47.29; 187/9 R, 10–12

[56] References Cited

U.S. PATENT DOCUMENTS

| | | | |
|---|---|---|---|
| 3,052,323 | 9/1962 | Hopfeld | 187/10 |
| 3,907,138 | 9/1975 | Rhodes | 214/370 |

*Primary Examiner*—Robert G. Sheridan
*Attorney, Agent, or Firm*—Dominik, Knechtel, Godula & Demeur

[57] ABSTRACT

A stacker attachment for use to extend the versatility of a battery powered two wheel hand truck which can lift loads from one level to another and, more importantly, operate as a walker for moving loads up and down the stairs; but which two wheel hand truck cannot operate as a stacker because its inner movable frame can never be raised above the wheels at the bottom of the stationary frame of the two wheel hand truck. The stacker has a long stationary frame but a short inner movable frame relative to the stationary frame. The stacker has an elongated screw shaft which freely rotates in a journal at the top of the long stationary frame, but which is operatively joined to a bearing nut fixed to the top wall of the inner movable frame, and is operatively engaged to the electric motor. The short inner frame has a long lifting path along the elongated stationary frame for lifting and stacking loads. The stacker is releasably but securely mounted to the two wheel hand truck, and the stacker has conductors and elongated battery leads which can be connected to the battery carried by the two wheel hand truck. Switch means on the stacker selectively rotate the stacker lead screw in one of two opposite rotational directions to lift the inner movable frame, and an attached lifting plate raises loads for stacking, and also lowers such inner movable frame to its starting position at the bottom of the stacker.

12 Claims, 6 Drawing Figures

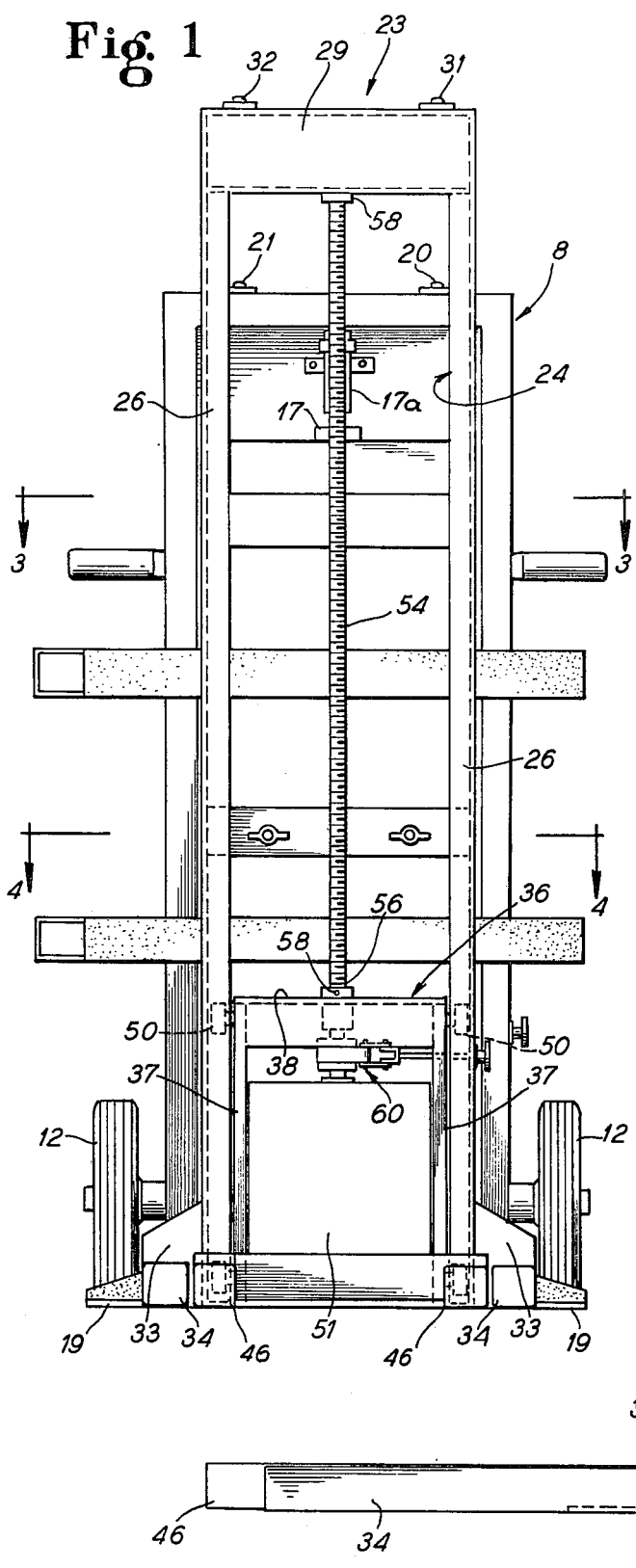
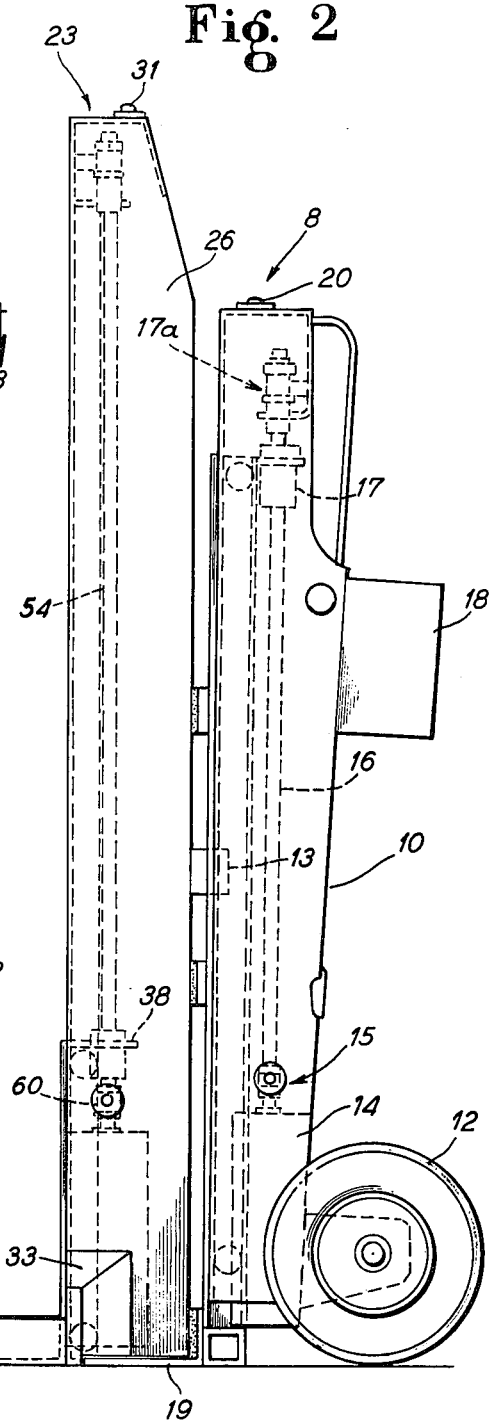

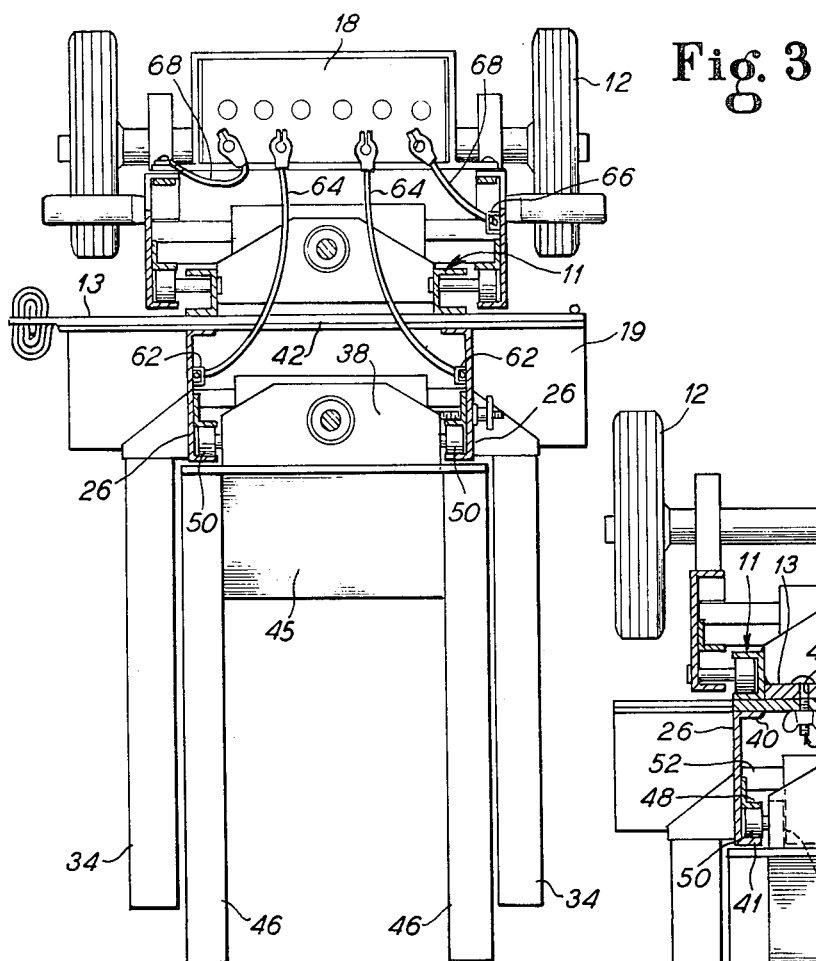
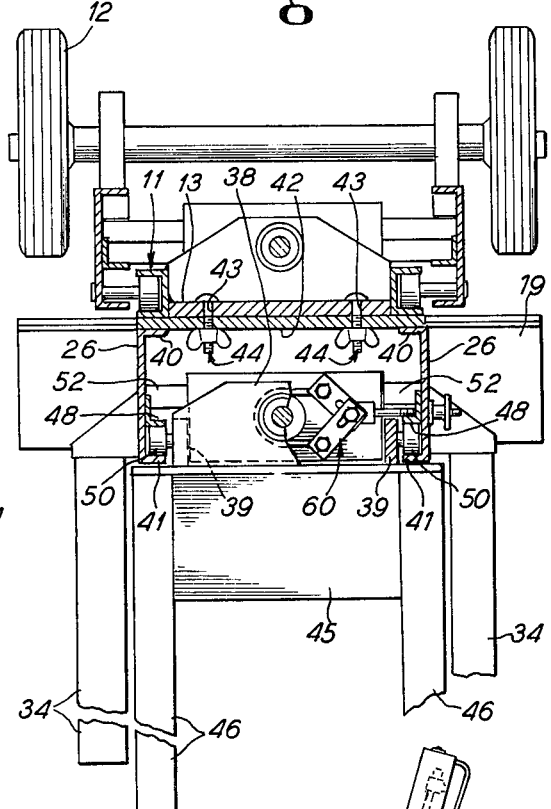
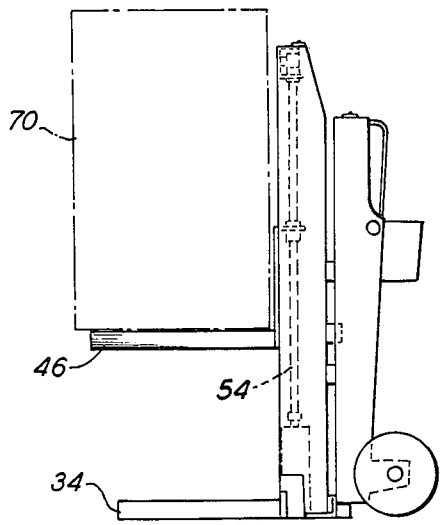

ELECTRICALLY POWERED HAND TRUCK WITH STACKER ATTACHMENT

FIELD OF THE INVENTION

This invention relates to the field of electrically powered stackers; and more particularly relates to a stacker designed to be cooperatively mounted to a previously known and used battery powered two wheel hand truck which can be used to walk loads up and down the stairs and lift loads from one level to another, but which cannot be used for stacking.

BACKGROUND OF THE INVENTION AND RELEVANT ART

A highly utilitarian battery powered two wheel hand truck has been disclosed and claimed in U.S. Pat. No. 3,907,138. A companion patent, U.S. Pat. No. 3,901,396 claims the method of using certain features of the disclosed battery powered two wheel hand truck in moving loads up and down the stairs by a walking technique. The disclosures in both U.S. patents are essentially the same, but the older U.S. patent claims the apparatus in which an elongated screw shaft is cooperatively and advantageously in constant contact with a brake which force is insufficient to prevent the lead screw from operating when the electric motor is turned on. Yet, the force of the brake is sufficient to hold the load carried by the two wheel hand truck when the electric motor is turned off. This instant and automatic braking action operates simply by turning the motor off, and yet the braking action is instantly overcome by the torque of the lead screw when the motor is turned on. Such instant engagement and release of the braking action allows a truck of this type to be successfully used in a method for precise and quick carrying of loads up and down the stairs.

A brief description of the use of the battery powered two wheel hand truck for moving loads up and down the stairs will illustrate why such two wheel hand truck is incapable of operating as a stacker. The wheels are attached to the bottom of the stationary frame which never moves, only the inner frame moves, and it never moves above the wheels at the bottom of the stationary frame. To move loads up the stairs, the truck is first at ground contact at the foot of the stairs with the bottom of the inner movable frame aligned generally with the bottom of the stationary frame. A switch is operated to start the power means by operating an electric motor so that the inner movable frame moves downwardly or below the wheels, the only way such frame moves relative the wheels. The inner frame instantly contacts the ground surface and this causes an opposite reaction which raises the wheels in the stationary frame above the inner frame. The inner frame, in a sense, is moving against the immovable floor so the stationary frame, and its attached wheels, have no place to go but up. The operator allows the stationary frame and wheels to rise to a selected stair height quickly and precisely. The operator turns off the switch so that the load carried by the two wheel hand truck is instantly held by the brake which is always operatively engaged to the power means. This allows the operator to tilt the load to clear the bottom stair, whereupon the operator turns on another switch to reverse the power means so that now the inner movable frame moves up towards the wheels resting on the stair. The operator selects a stair where he wants a load to stop at the bottom of the load and quickly turns off the switch. This precisely and instantly stops the movement of the inner load at such selected stair and the brake means instantly hold the load. This stair is usually one or two stairs below the stair on which the wheels are, unless the stair is wide enough to accomodate both the wheels and the load. The process is repeated until the load is walked up the stairs.

The reverse procedure is followed to walk a load down the stairs, that is, first lowering the inner frame below the wheels to engage a selected lower stair, then moving the wheels to clear an upper stair. Another switch is operated to raise the inner movable frame, but such action results in the stationary frame and the wheels being lowered to a selected stair because such wheels are not in ground contact. There is no point of contact except the load on the stairs so "raising" the inner movable frame does not allow the frame to move to any other place, thus resulting in the stationary outer frame and the wheel being lowered selectively in a quick and precise manner to a selected stair. The procedure is repeated until the load is walked down the stairs.

The foregoing illustration shows that the two wheel hand truck, as disclosed in the foregoing patents, is incapable of operating as a stacker, that is, of lifting the load on the movable frame above the wheels at the bottom of the stationary frame.

OBJECTS AND ADVANTAGES OF THE INVENTION

It is an object of the invention to extend the versatility of the apparatus and method disclosed and claimed in the identified U.S. patents by providing a stacker attachment which is cooperatively mounted with the hand truck to permit the operator to stack loads in conventional ways by raising such loads above the wheels of a battery powered two wheel hand truck. An important advantage realized from attaining this object is that the stacker and the two wheel hand truck are cooperatively mounted to utilize supportive features of the two wheel hand truck.

Another object is to provide a stacker attachment to be used in combination with a two wheel hand truck so that the battery source on such hand truck can be used as an energy source on such hand truck can be used as an energy source to operate the stacker to lift loads repeatedly for stacking. A further advantage which flows from realizing this object is that the stacker attachment is readily, quickly and reliably secured to the stacker so that it may be safely used with said two wheel hand truck during the stacker operation.

Yet another object of the invention is to provide a stacker which increases the versatility of the two wheel hand truck without detracting at all from the utility from the two wheel hand truck which can still be used to lift loads up and down the stairs or from one level to another, with the stacker mounted in place. This advantage is realized from the unique combination of the two wheel hand truck and the stacker which permits the combination to be used selectively as a stacker or as the usual lifter without requiring the operator to disconnect the stacker. Many situations may arise where it is intended to use the combination principally as a stacker throughout the day, but such use being interrupted by a requirement to walk a load up a short flight of stairs. In such a case, it is understandable that the operator would not want to disconnect the stacker. If the two wheel hand truck is to be used substantially for moving loads up and down the stairs, then the operator would desirably demount the stacker from its secure connection to the two wheel hand truck.

DESCRIPTION OF THE VIEWS OF THE DRAWINGS

The foregoing objects and advantages are now attained, together with other objects and advantages which will occur to practitioners, from considering the following disclosure of the invention, which include drawings having the following views.

FIG. 1 is a front elevational view showing the stacker releasably mounted to the two wheel hand truck.

FIG. 2 is a side elevational view of the stacker attachment releasably mounted to the two wheel hand truck as illustrated in FIG. 1.

FIG. 3 is a view, partly in section, taken along line 3—3 in FIG. 1.

FIG. 4 is a view, partly in section, and with portions removed, taken along line 4—4 in the view of FIG. 1.

FIG. 5 is a side elevational view of the stacker attachment mounted to the two wheel hand truck, on a substantially reduced scale, showing the stacker lifting a load in a stacking operation.

FIG. 6 is a side elevational view, on a scale similar to that of FIG. 5, showing the two wheel hand truck used for lifting a load from one level to the other while the stacker attachment is mounted in place.

SUMMARY OF THE INVENTION

A stacker attachment made to be cooperatively mounted to a two wheel battery powered hand truck of the type described in foregoing U.S. Pat. Nos. 3,907,138 and 3,901,396. Such a two wheel hand truck has an elongated stationary outer frame and an elongated movable inner frame which can only move in lowered position relative to the bottom of the stationary frame where the wheels are mounted. The two wheeled hand truck has a battery mounted on the stationary frame, an electric motor mounted to the stationary frame and power means, such as a lead screw shaft, interconnected between the electric motor, movable inner frame and stationary outer frame so that selective switch means can rotate the lead screw in a selected rotational direction to either lower the inner frame below the wheels or to raise the inner frame up to the level of the wheels. Conductors lead from the electric motor and battery lead portions are provided at the ends of the conductors for connecting to the battery.

A stacker attachment is now provided which also has a stationary outer frame and a movable inner frame, except the inner movable frame is substantially shorter than the outer frame. Thus the inner frame has a long lifting path for stacking loads. The stacker attachment has an electric motor mounted to the stationary frame at the bottom and mechanical means interconnect the electric motor, the inner movable frame and the stationary outer frame so that selective operation of switch means on the stacker attachment raises the inner frame along the length of the elongated lower frame, or lowers the inner frame along the length of the elongated outer frames. The stacker attachment has mounting means to allow it to be releasably mounted to mounting means on the two wheel hand truck, and said stacker attachment further has stabilizing legs for ground contact mounted to the stationary outer frame. Lifting legs and a lifting plate are mounted to the movable inner frame of reduced height. The two wheel hand truck has a toe plate at the bottom of its inner movable frame to support loads, and this toe plate is enlarged relative to the lifting legs and plate fixed to the inner movable frame of reduced height on the stacker attachment. This permits the smaller lifting plate to be supported by the enlarged toe plate to further secure the mounting of the stacker attachment to the two wheeled hand truck.

Thus, the stacker attachment is securely mounted to the two wheel hand truck quickly, securely and reliably. It is not necessary that the stacker attachment have its own battery since elongated shielded conductors on the stacker have battery leads sufficiently long to be connected to the terminals of the battery on the two wheel hand truck, after first disconnecting the battery leads of the two wheel hand truck. Not only is the stacker attachment quickly and securely mounted to the two wheel hand truck, but the energy source of the hand truck is quickly connected to operate the movable inner frame of reduced height so it may operate as a stacker. Secure mounting of the stacker attachment to the two wheel hand truck gives the operator an election to use the mounted combination in the conventional manner for which the two wheel hand truck is designed. In other words, mounting of the stacker does not prevent the two wheel hand truck to be used for lifting loads from one level to another, or for walking loads up and down the stairs.

DETAILED DESCRIPTION OF THE INVENTION

Referring now to the drawings, FIG. 1 illustrates generally at 8 the two wheeled electrically powered hand truck of the type disclosed fully in the U.S. patents previously identified. Such a hand truck has a stationary outer frame 10 and a movable inner frame 11 which can best be seen in FIGS. 3, 4 and 6. The bottom of the stationary frame has a pair of wheels 12 which allows an operator to move the hand truck along ground surface, as well as to lift loads up and down the stairs or the like.

FIG. 2 will allow better views of certain components of the two wheeled hand truck. There are a number of cross braces between the sides of the stationary frame, but cross brace 13 is identified because it will serve as a mounting means for attaching the stacker attachment, as will be described in greater detail. The two wheel hand truck has an electric motor 14 positioned at the sides of the stationary frame, and a brake assembly, shown generally as 15, is in constant contact with a brake component of an elongated screw shaft 16. The screw shaft extends between operatively between the electric motor, a bearing nut 17 fixed to the movable frame and to a journal 17a fixed to the stationary frame. The end of the lead screw freely rotates in journal 17a.

A toe plate 19 is mounted to the bottom of the movable frame, and switches 20, 21 are shown at the top of the stationary frame for selectively operating the lead screw in one of two rotational directions to eighter lower the movable frame below the wheels or to raise the movable frame up to the level of the wheels.

The detailed description will now be directed principally to the stacker attachment. The structures, parts and elements will thus be viewed by first considering FIGS. 1-4. The stacker attachment assembly is shown generally at 23 and includes a stationary outer frame shown generally at 24. Such a frame has a pair of spaced sides 26 connected by a top cross member 29, shown as a connecting rectangular plate. Up and down switches 31 and 32 are shown at the top of the connecting cross member 29, and these switches selectively operate the stacker as will be later described. Each of the spaced sides has a tapered gusset body 33 fixed at the bottom and extending transversely. Such gusset bodies serve as brackets for stabilizing legs 34 which extend at right angles to the sides of the stationary frame and are adapted for ground contact to stabilize the stacker attachment.

The stacker attachment has an inner movable frame, shown generally as 36, which is of substantially reduced height relative to the height of the stationary frame. This allows the movable inner frame to have a long lifting stroke along the length of the stationary frame during stacking operations. The movable inner frame has a top wall 38 and spaced sides 37. The inner movable frame has a generally inverted U configuration.

The interiors of the sides 26 of the stationary frame are in the form of a channel as seen in the view of FIG. 4. Rear flanges 40 are fixed by bonding or the like to a rear cross plate 42 which is positioned to be aligned with the cross plate 13 of the hand truck. Both cross plates have mounting apertures which are registered when mounting the stacker attachment so that common mounting bores 43 are formed. Releasable fasteners, shown as wing and nut assemblies 44, pass through the common mounting bores to securely but releasably mount the stacker to the hand truck.

It is also seen that the interiors of the sides 26 have angles 48 fixed by welds or the like to the interiors of the sides, and these angles, together with the front flanges 41, form a track on the interiors of each of the sides of the stationary frame. A roller shaft assembly 50 extends from the sides of the inner movable frame to engage this track, such track extending along substantially the entire length of the stationary frame.

An electric motor 51 is at the bottom of the stacker attachment, positioned within the inner movable frame when it is at the bottom of the stacker attachment. Such electric motor is mounted to the spaced sides 26 of the stationary frame by fixed rod brackets 52. An elongated screw shaft 54 extends from the electric motor through a bearing nut assembly 56 which is fixed to the top wall 38 of the inner movable frame. Such elongated lead screw extends to the top cross member 29 of the stationary frame where it is freely rotated in journal 58.

A brake assembly, shown generally as 60, is always in contact with a brake component fixed to the lead screw, in the same manner as is present on the hand truck, such brake assembly not being further described herein since an adequate operating description has been previously made and a completely detailed description may be found in the patents previously identified. It should be restated, however, that this brake assembly is constantly in contact with the lead screw and has sufficient force to hold the stacker loads when the electric motor is turned off. However, the torque of the operating lead screw overcomes the force of the brake assembly when the electric motor is operating.

Looking now at FIG. 3, the interiors of the spaced sides of the stationary frame have elongated conductor shields 62 in the form of narrow channels. Conductors from the electric motor extend along the length of the shields and extend out of the shields as battery lead portions 64. Such battery leads are sufficiently long to be connected to the terminals of the battery 18 on the two wheel truck. The two wheel truck also has elongated conduit shields 66 with battery leads 68 which extend out of the shields and are connected to the terminals of the battery 18. Battery leads 68 are disconnected and battery leads 64 are connected so that the stacker may be operated by switches 31, 32 to selectively raise or lower the stacker and its load for various stacker operations.

FIG. 5 illustrates the lead screw 54 operating the stacker, and shows the lifting legs 46 supporting a load 70. This illustration relates to normal stacking operation. FIG. 6 illustrates that even with the stacker attachment releasably mounted to the two wheel truck, such two wheel truck can be used in its conventional manner for lifting the load 70 from a lower ground level 72 to a higher level 74. The higher level may represent a higher stair and lower level may represent the foot of the stair.

The claims of the invention are now presented, and the terms of such claims may be better understood by reference to the language in the preceeding specification, and the views of the drawings.

What is claimed is:

1. A stacker attachment for releasably mounting to a two wheel, battery powered hand truck which has a movable elongated inner frame, an elongated stationary outer frame, said inner frame movable only below the wheels at the bottom of said stationary frame, said stacker attachment including
    an elongated outer stationary frame having spaced sides and a connecting top, a stabilizing member extending at a right angle from the bottom of the spaced sides for making ground contact, mounting means on said stationary frame for releasably mounting the stacker to a two wheel hand truck,
    a movable inner frame having spaced sides and a connecting top member, said inner movable frame having a height substantially less that the height of the stationary frame, a lifting member mounted at a right angle to the bottom of said movable frame,
    an electric motor at the bottom of the stacker, means mounting said motor to the sides of the stationary frame,
    mechanical means to raise and lower said movable inner frame, said mechanical means interconnected between said electric motor, said stationary frame, and said movable frame,
    conductors extending from said electric motor with battery lead portions for connection to a battery, and
    switch means to selectively operate said mechanical means to raise the movable frame, and mounted lifting member, above the bottom of the stationary frame, and to lower the movable frame, and mounted lifting member, to the bottom of said stationary frame.

2. A stacker attachment as in claim 1 wherein said mechanical means include a track on the interiors of each side of the stationary frame, each of said tracks extending substantially along the entire length of such sides of the stacker, a bearing member mounted to the exterior of each side of the movable inner frame and positioned to ride the adjacent track in the side of the stationary frame, and further including an elongated screw shaft operatively engaged at the bottom to the electric motor, and operatively engaged to a bearing member fixed to the top of the inner movable frame and freely journalled to an upper part of the stationary frame.

3. A stacker attachment which includes the features of claim 1 above wherein said stabilizing member includes a leg fixed to each side of the stationary frame.

4. A stacker attachment which includes the features of claim 3 wherein said lifting member includes a leg attached to each side of the movable frame, and further includes an angle plate having an upright wall spanning said legs and a substantially larger lifting plate to receive loads for stacking.

5. A stacker attachment which includes the features of claim 4 above wherein said inner movable frame has a generally inverted U configuration, and has a height slightly in excess of the height of the electric motor so that the movable frame has a long lifting path along the stationary frame for stacking loads.

6. A stacker attachment which includes the features of claim 1 above wherein said conductors and battery lead portions are sufficiently long to be connected to a battery of a two wheel hand truck when said stacker attachment is releasably mounted to the hand truck.

7. A stacker attachment which includes the features of claim 6 above wherein said elongated conductor shields are mounted to the interiors of the sides of the stationary frame, said conductors are protected within such shields, and said battery lead portions extend out of said shields.

8. A stacker attachment which includes the features of claim 1 above wherein said mounting means on said stationary frame include a mounting member fixed to each side of the stationary frame, and further includes fasteners for interlocking the mounting means with a two wheel hand truck when the stacker attachment is releasably mounted to said hand truck.

9. A stacker attachment which includes the features of claim 8 above wherein the mounting members attached to both sides of the stationary frame is a cross brace spanning the sides of the stationary frame, said cross brace having mounting bores, and said fasteners being bolts for passing through said mounting bores and for interlocking with a two wheel hand truck when said stacker attachment is releasably mounted to said hand truck.

10. A stacker attachment which includes the features of claim 8 above wherein said stacker attachment forms a mounted combination with a two wheel battery powered hand truck having a movable elongated inner frame, an elongated stationary outer frame, said inner frame being movable only above the wheels at the bottom of said stationary outer frame, a battery mounted on the elongated stationary outer frame, an electric motor operated by said battery, means operated by said electric motor to raise and lower said inner frame only above the wheels at the bottom of said elongated stationary frame, and a mounting member on said elongated stationary frame positioned for alignment with said mounting members on the stacker attachment, and said releasable fasteners interlocking the aligned mounting members.

11. The combination of the stacker attachment mounted to the two wheel hand truck as in claim 10 above wherein said mounting members on each of the stacker attachment and the two wheel hand truck are cross braces extending to and attached to the sides of the stationary frames, respectively, of the two wheel hand truck and the stacker attachment, each cross brace having mounting bores in registry after the stacker attachment is positioned for mounting, and bolts passing through the registered bores to fix the stacker to the two wheel hand truck.

12. The combination of a stacker attachment mounted to a two wheel hand truck as in claim 11 above wherein said two wheel hand truck has a toe plate mounted at right angles to the sides of its inner movable frame, said two wheel hand truck toe plate being larger than said lifting plate on the stacker attachment, and wherein the lifting plate of the stacker attachment is supported by the larger toe plate of the two wheel hand truck in the combination of the stacker attachment releasably mounted to said hand truck.

* * * * *